(12) United States Patent
Diab (10) Patent No.: US 8,195,964 B2
(45) Date of Patent: Jun. 5, 2012

(54) METHOD AND SYSTEM FOR ENERGY EFFICIENT NETWORKING VIA PACKET INSPECTION

(75) Inventor: Wael William Diab, San Francisco, CA (US)

(73) Assignee: Broadcom Corporaton, Irvine, CA (US)

( * ) Notice: Subject to any disclaimer, the term of this patent is extended or adjusted under 35 U.S.C. 154(b) by 401 days.

(21) Appl. No.: 12/477,391

(22) Filed: Jun. 3, 2009

(65) Prior Publication Data

US 2010/0115307 A1 May 6, 2010

Related U.S. Application Data

(60) Provisional application No. 61/111,653, filed on Nov. 5, 2008.

(51) Int. Cl.
*G06F 1/32* (2006.01)

(52) U.S. Cl. ........ 713/300; 713/323; 713/324; 370/230; 370/338; 370/356; 370/401; 370/537; 709/226; 709/229

(58) Field of Classification Search ................. 713/300, 713/323–324; 370/230, 338, 356, 401, 537; 709/226, 229
See application file for complete search history.

(56) References Cited

U.S. PATENT DOCUMENTS

| 6,721,355 | B1 * | 4/2004 | McClennon et al. ......... 375/222 |
| 6,795,450 | B1 | 9/2004 | Mills et al. |
| 6,856,597 | B1 | 2/2005 | Scott |
| 2003/0226050 | A1 | 12/2003 | Yik et al. |
| 2005/0188232 | A1 | 8/2005 | Weng et al. |
| 2006/0034295 | A1 | 2/2006 | Cherukuri et al. |
| 2007/0280239 | A1 | 12/2007 | Lund |
| 2008/0225841 | A1 | 9/2008 | Conway et al. |

FOREIGN PATENT DOCUMENTS

| EP | 1 473 870 | 11/2004 |
| EP | 1 484 876 | 12/2004 |
| EP | 1 494 407 | 1/2005 |
| GB | 2 337 672 | 11/1999 |
| WO | WO 00/31923 | 6/2000 |

OTHER PUBLICATIONS

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.
Grow, "802.1 and Energy Efficient Ethernet." Sep. 11, 2007, pp. 1-6, XP002509616.
Bennett et al., "Energy Efficient Ethernet." Jul. 16, 2007, pp. 1-70, XP002509615.
Gupta et al., "Dynamic Ethernet Link Shutdown for Energy Conservation on Ethernet Links." XP-002524616, pp. 6156-6161.
Wael Diab, "Energy Efficient Ethernet and 802.1." IEEE 802 Plenary, Nov. 16, 2007, XP-002524617.

* cited by examiner

*Primary Examiner* — M Elamin
(74) *Attorney, Agent, or Firm* — Duane S. Kobayashi (57) ABSTRACT

Aspects of a method and system for energy efficient networking via packet inspection are provided. In various embodiments of the invention, a network device may include one or more circuits operable to inspect one or both of ingress and/or egress packets in the network device. The one or more processors may be operable to predict traffic in the network device based on the inspection. The one or more processors may be operable to, based on the predicted traffic, control a mode of operation of the network device to manage power consumption in the network device. A downlink path within the network device may be configured based on inspection of packets conveyed along a corresponding uplink path. An uplink path within the network device may be configured based on inspection of packets conveyed along a corresponding downlink path.

14 Claims, 6 Drawing Sheets

METHOD AND SYSTEM FOR ENERGY EFFICIENT NETWORKING VIA PACKET INSPECTION

CROSS-REFERENCE TO RELATED APPLICATIONS/INCORPORATION BY REFERENCE

This patent application makes reference to, claims priority to and claims benefit from U.S. Provisional Patent Application Ser. No. 61/111,653, filed on Nov. 5, 2008.

This application also make reference to:
U.S. patent application Ser. No. 12/470,785 filed on May 22, 2009, still pending;
U.S. patent application Ser. No. 12/470,970 filed on May 22, 2009 still pending;
U.S. patent application Ser. No. 12/470,991 filed on May 22, 2009 still pending; and
U.S. patent application Ser. No. 12/471,861 filed on May 26, 2009 still pending.

Each of the above stated applications is hereby incorporated herein by reference in its entirety.

FIELD OF THE INVENTION

Certain embodiments of the invention relate to networking. More specifically, certain embodiments of the invention relate to a method and system for energy efficient networking via packet inspection.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy efficient networking via packet inspection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for energy efficient networking via packet inspection. In various embodiments of the invention, a network device may comprise one or more circuits that are operable to inspect one or both of ingress and/or egress packets in the network device. The one or more circuits may be operable to predict traffic in the network device based on the inspection. The one or more circuits may be operable to, based on the predicted traffic, control a mode of operation of the network device to manage power consumption in the network device. The network device may be configurable to operate in one or more energy saving modes comprising a low power idle mode and/or a subset PHY mode. A downlink path within the network device may be configured based on inspection of packets conveyed along a corresponding uplink path. An uplink path within the network device may be configured based on inspection of packets conveyed along a corresponding downlink path. The packets may be inspected to detect control packets associated with one or more protocols. Upon detecting a control packet, the one or more circuits may be operable to schedule transitions between modes of operation. The one or more circuits may be operable to inspect a packet to determine one or more applications running on one of more link partners communicatively coupled to the network device. The one or more circuits may also be operable to inspect a packet to determine one or more protocols in use by one or more link partners communicatively coupled to the network device.

Figure 1A:
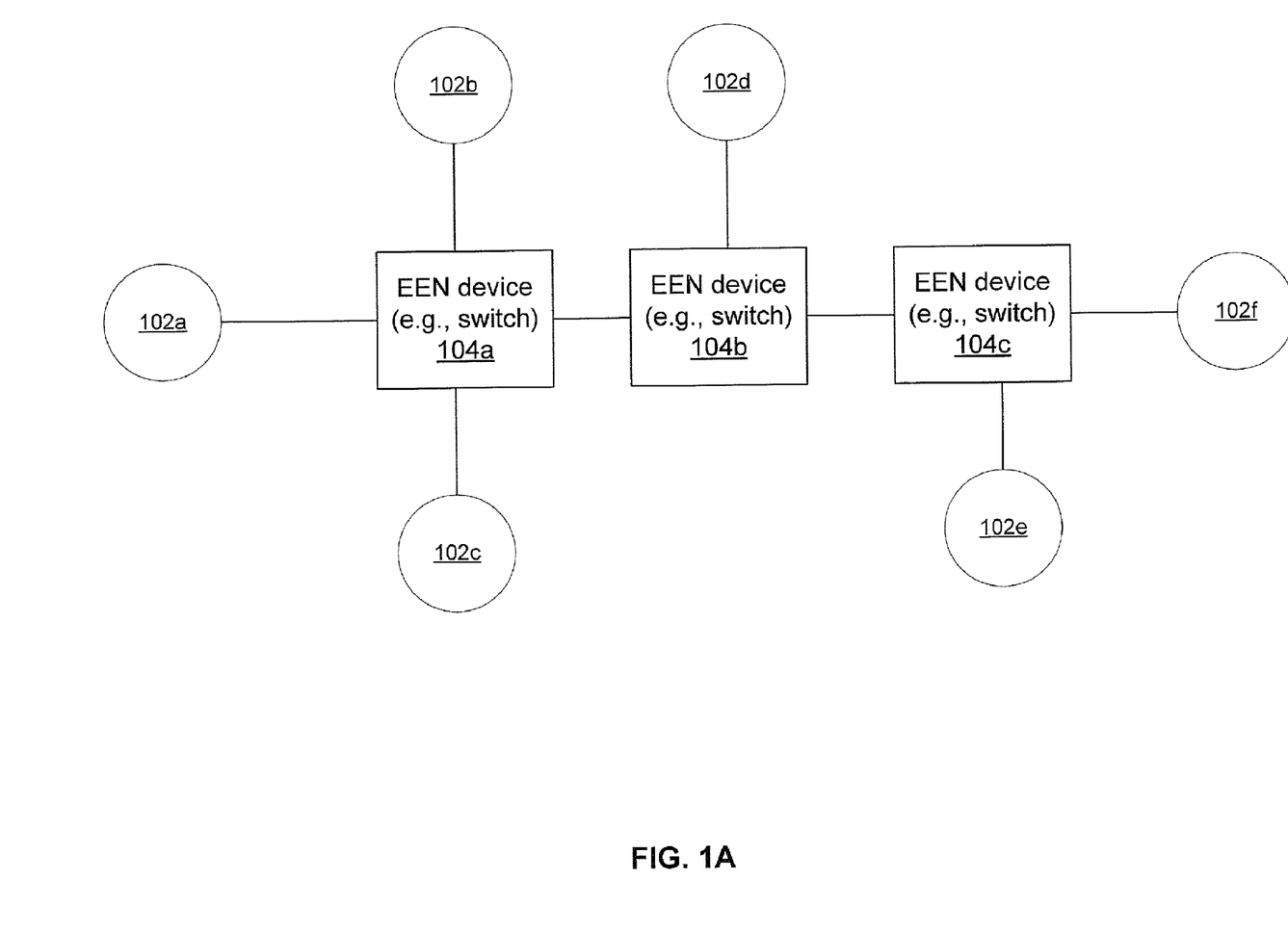
FIG. 1A is a diagram illustrating an exemplary network in accordance with an embodiment of the invention.

FIG. 1A is a diagram illustrating an exemplary network in accordance with an embodiment of the invention. Referring to FIG. 1A there is shown a network comprising a plurality of end-points 102 and network devices 104. The end-points may comprise, for example, computers, laptops, mobile devices, audio/video equipment. The network devices 104 may comprise, for example, routers, switches, or bridges. Details of the exemplary network device 104 are described with respect to FIG. 104b.

Figure 1B:
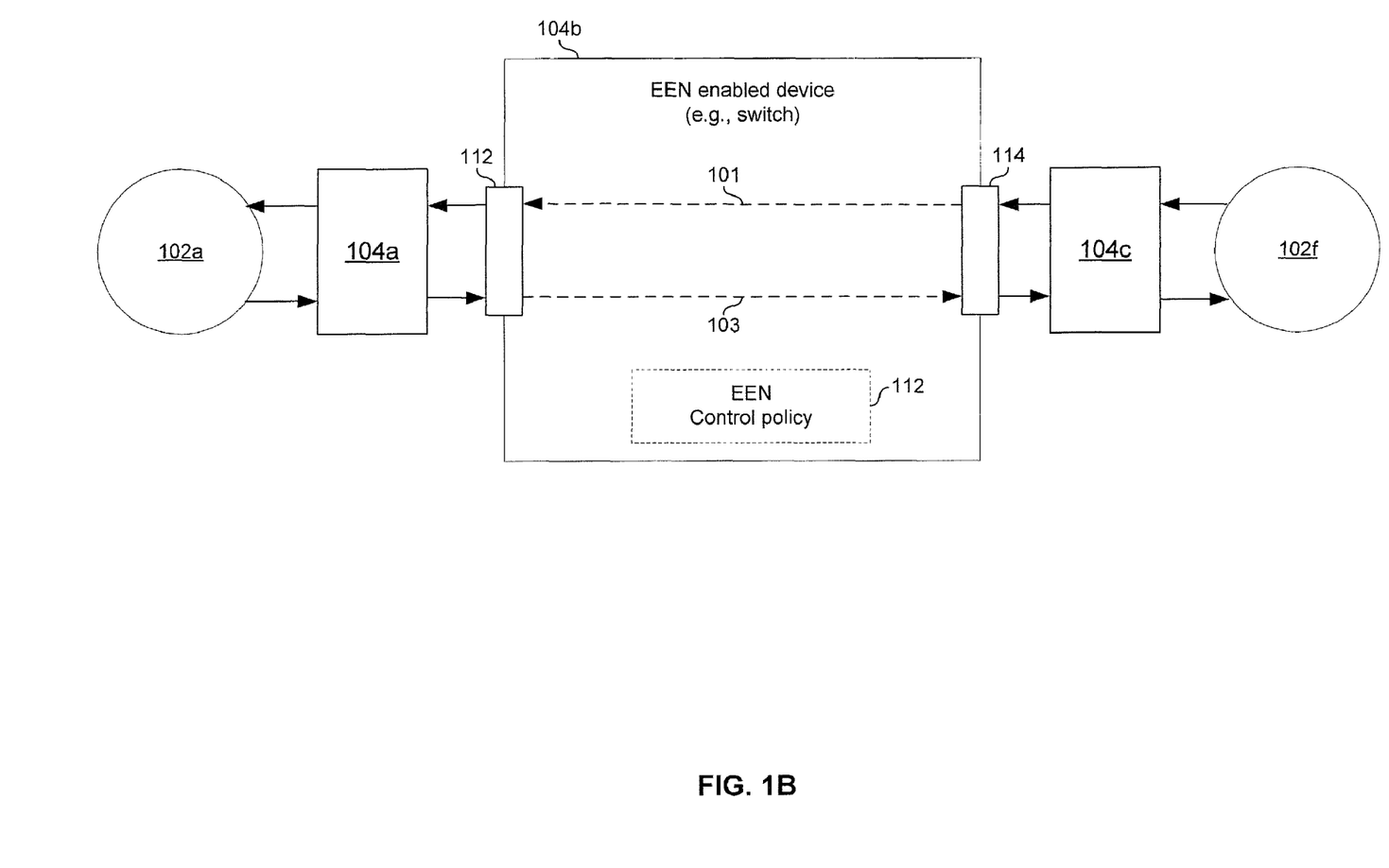
FIG. 1B is a diagram illustrating communications via a network device operable to implement energy efficient networking (EEN) techniques based on packet inspection, in accordance with an embodiment of the invention.

FIG. 1B is a diagram illustrating communications via a network device operable to implement energy efficient networking (EEN) techniques based on packet inspection, in accordance with an embodiment of the invention. Referring to FIG. 1B, there is shown a host 102a, a client 102f, ports 112 and 114, and a network device 104b.

The host 102a may comprise suitable logic, circuitry, interfaces, and/or code that may be operable to generate and/or store information and communicate that information over a network. The host 102a may comprise, for example, a server, a personal computer, or a storage device.

The client 102f may comprise suitable logic, circuitry, interfaces, and/or code that may be operable to receive information over a network and process the received information and/or present the received and/or processed information to a user. The client 102f may comprise, for example, a personal computer, a smart phone, a television, or a set-top-box. The user may comprise, for example, a person or an application. The host 102a and the client 102f may communicate via the ports 112 and 114 of the network device 104.

The network device 104b may comprise suitable logic, circuitry, interfaces, and/or code operable to receive and forward data via network ports 112 and 114 in an energy efficient manner. In this regard, the network device 104b may implement an energy efficient networking (EEN) policy 112 that may result in the implementation of one or more EEN techniques such as low power idle (LPI) and subset PHY (also referred to as subrating). LPI may generally refer a family of EEN techniques where, instead of transmitting conventional IDLE symbols during periods of inactivity, the PHY devices 110 may remain silent and/or communicate signals other than conventional IDLE symbols. Sub-rating, or sub-set PHY, may generally refer to a family of EEN techniques where the PHYs are reconfigurable, in real-time or near real-time, to communicate at different data rates. For LPI, an energy saving mode may be, for example, a mode in which the rate at which IDLE symbols are transmitted is reduced. For subset PHY, an energy saving mode may be, for example, a mode in which the either no data is communicated, or a mode in which data is communicated at a low(er) rate.

The port 112 may be communicatively coupled to the host 102a via the network device 104a. Similarly, the port 114 may be communicatively coupled to the client 102f via a the network device 104c.

The network device 104b may forward data between the host 102a and the client 102f along an uplink path 101 and a corresponding downlink path 103. The uplink path 101 may comprise the port 114; the port 112; and logic, circuitry, interfaces, and/or code that convey data from the port 114 to the port 112. Similarly, the downlink path 103 may comprise the port 112; the port 114; and logic, circuitry, interfaces, and/or code that convey data from the port 112 to the port 114.

Accordingly, various portions of the network device 104b may be configurable to operate in various modes of operation, wherein power consumption of the network device 104b varies among the different modes of operation. For example, the network device 104b may be configured to operate in an LPI mode in which various portions of the network device 104b, such as echo cancellers, crosstalk cancellers, and other DSP functions, may be powered down. For another example, the network device 104b may be configured to operate in a subset PHY mode in which portions of the network device 104b associated with one or more physical channels may be slowed down and/or powered down. In this regard, the network device 104b may implement the EEN control policy 112 which may be utilized to determine how and when to transition between modes of operation. The EEN control policy 112 may be utilized to determine when to transition between modes of operation based on a variety of information and/or parameters. In this regard, the network device 104b may be operable to inspect ingress and/or egress packets and the information in the packets may be provided as inputs to the EEN control policy 112. The inspection may be on OSI layer 2, layer 3, or other and/or higher protocol information. In one embodiment of the invention, the inspection may look for lack of activity on an ingress path and/or on a corresponding egress path.

The network device 104b may be capable of operating at one or more standard rates such as 10 Mbps, 100 Mbps, 1 Gbps, and 10 Gbps (10BASE-T, 100BASE-TX, 1GBASE-T, and/or 10GBASE-T); potentially standardized rates such as 40 Gbps and 100 Gbps; and/or non-standard rates such as 2.5 Gbps and 5 Gbps. The network device 104b may be capable of operating at one or more standard rates such as 10 Gbps (10 GBASE-KX4 and/or 10 GBASE-KR); and/or non-standard rates such as 2.5 Gbps and 5 Gbps. The network device 104b may be capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the network device 104b may communicate over a passive optical network (PON). The network device 100 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non-standard speeds and non-standard technologies, for example, single channel, two channel or four channels may also be supported. More over, TDM technologies such as PON at various speeds may be supported. The network device 104 may support transmission and/or reception at a high(er) data in one direction and transmission and/or reception at a low(er) data rate in the other direction.

In operation, the host 102a and the client 102f may exchange data via the network device 104b. However, traffic patterns between host 102a and client 102f may fluctuate depending on, for example, applications running and/or types of data being processed and communicated. Consequently, implementing EEN techniques, such as low power idle (LPI) or subset PHY, may provide challenges because of the latency associated with transitioning into and out of an energy saving mode. In this regard, if, based on the EEN control policy 112, a decision is made to go into an energy saving mode and then new data arrives shortly thereafter, transitioning back out of energy saving mode will introduce unnecessary latency for the data. Moreover, transitioning into the energy saving mode and immediately back out of the energy saving mode may consume more energy than is saved during the brief time in the energy saving mode.

Accordingly, aspects of the invention may enable inspecting ingress and/or egress packets to predict traffic in the network device 104b. In this regard, ingress and/or egress traffic may be inspected to look for control packets. Information extracted from, or based on, detected control packets may be utilized in conjunction with the EEN control policy 112 to predict traffic on either the uplink 101 path and/or the downlink path 103. In this regard, control packets may be packets communicated to prepare, maintain, coordinate and/or otherwise support communication of data between two or more network devices.

In an exemplary embodiment of the invention, the client 102f may request data from the host 102a by transmitting a request packet to the host 102a via the network device 104. Upon detecting the request packet, and based on the EEN control policy 112, the network device 104b may be triggered to transition out of an energy saving mode (if the network device 104b is already in an energy saving mode) or hold off from entering an energy saving mode (if the network device 104b is not already in an energy saving mode). Accordingly, when the host 102a responds to the request packet and begins transmitting the data to the client 102f, the network device 104b will not be in an energy saving mode and will not introduce additional latency to the data.

In another exemplary embodiment of the invention, the client 102f and host 102a may exchange one or more control packets to setup a VoIP call. Upon detecting the setup packets, and based on the EEN control policy 112, the network device 104b may be triggered to transition out of an energy saving mode or hold off from entering an energy saving mode. Accordingly, when the host 102a and the client 102f begin exchanging voice data the network device 104b will not be in an energy saving mode and will not introduce additional latency to the voice data.

In some embodiments of the invention, the uplink path 101 may be configured independently of the downlink path 103. In this manner, based on the EEN control policy 112, the uplink path 101 may be place in an energy saving mode while the downlink path 103 remains active to process and forward data from the host 102a.

Figure 2:
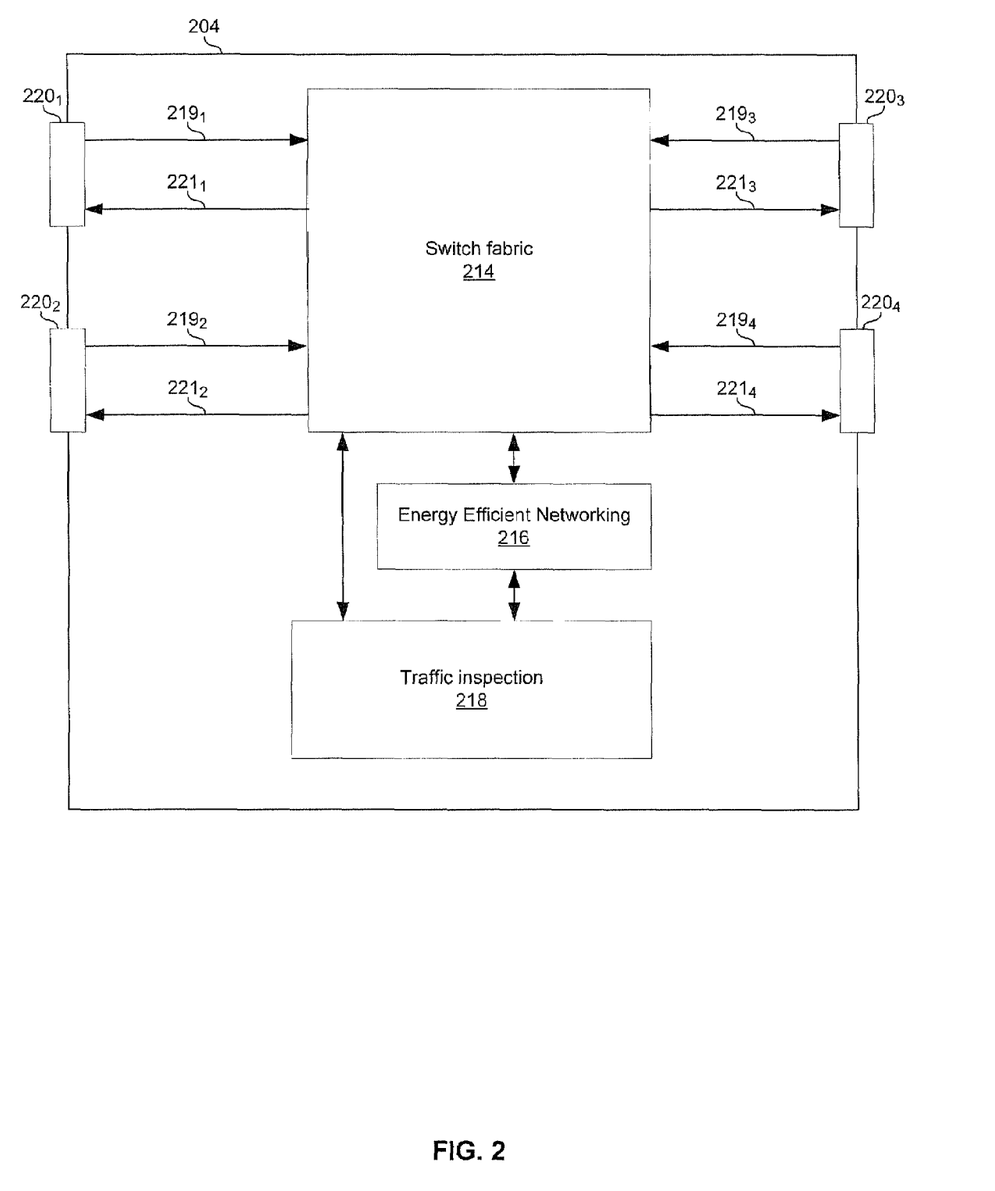
FIG. 2 is a block diagram of an exemplary network device operable to implement EEN techniques based on packet inspection, in accordance with an embodiment of the invention.

FIG. 2 is a block diagram of an exemplary switch operable to implement EEN techniques based on packet inspection, in accordance with an embodiment of the invention. Referring to FIG. 2, there is shown a switch 204 comprising ports $220_1$-$220_4$, switch fabric 214; EEN module 216; and traffic inspection module 218.

The switch 204 may be similar to the network device 104 described with respect to, for example, FIG. 1A. In this regard, while a switch is utilized for illustration, the invention is not so limited. Furthermore, the invention is not limited in the number of ports and aspects of the invention may be found in network devices comprising any number of ports. Also, although the switch fabric 214, the EEN module 216, and the traffic inspection module 218 are shown as distinct blocks, the invention is not so limited and various logic, circuitry, interfaces, and/or code may be shared amongst them. In this regard, the EEN module 216 may, for example, comprise hardware integrated on a single chip, distributed among a plurality of chips, or implemented in software.

The switch fabric 214 may comprise suitable logic, circuitry, interfaces, and/or code that may be operable to route data between the ports $220_1$-$220_4$. The network device 204 may be communicatively coupled to four link partners via the four ports $220_1$-$220_4$. Additionally, the switch fabric 214 may be operable to route data to and/or from the EEN module 216 and/or the traffic inspection module 218. In various embodiments of the invention, one or more portions of the switch fabric 214 may be dedicated to one of the ports $220_1$-$220_4$. In various embodiments of the invention, one or more portions of the switch fabric 214 may be shared among a plurality of the ports $220_1$-$220_4$. Additionally, various portions and/or resources of the switch fabric 214 may be dynamically allocated to one or more of ports $220_1$-$220_4$ as needed.

The EEN module 216 may comprise suitable, logic, circuitry, and/or interfaces that may be operable to implement an EEN control policy. Additionally or alternatively, code executed by the EEN module 216, may be operable to implement an EEN control policy. The EEN control policy may be utilized to balance the tradeoff between performance and power consumption in the switch 204. Accordingly, the EEN control policy may be utilized to determine how and when to transition into and out of various modes of operation, where power consumption and performance of the switch 204 may be different for different modes of operation. To implement the EEN control policy, the EEN module 216 may be operable to generate control signals to configure and/or control various portions of the switch 204. Additionally, the EEN module 216 may be operable to generate EEN packets for communicating EEN information to a link partner.

The traffic inspection module 218 may comprise suitable logic, circuitry, interfaces, and/or code that may be operable to parse packets and/or identify the contents of the packets. For example, the traffic inspection module 218 may be operable to detect various headers associated with various protocols that operate at various OSI layers. The traffic inspection module 218 may also utilize packet payload inspection. In this manner, the traffic inspection module 218 may be operable to determine characteristics of the traffic such as type(s) of data being communicated, applications generating and/or receiving the data, and latency requirements of the data. Based on the inspection, the traffic inspection module 218 may output signals and/or data to the switch fabric 214 and/or the EEN module 216.

In operation, a packet may arrive at the switch fabric 214 via one of the ports $220_1$-$220_4$. The switch fabric 214 may inspect OSI layer 2 headers to determine which of the ports $220_1$-$220_4$ via which the packet should be forwarded. In this manner, paths through the switch 204 may be determined. The switch fabric 214 may provide layer 2 headers and/or and indication of the packet's egress port to the EEN module 216. Additionally, the switch fabric 214 may convey the packet to the traffic inspection module 218 for deeper inspection of information in the packet associated with higher OSI layers. The traffic inspection module 218 may inspect the packet and determine one or more protocols, traffic types, and/or applications associated with the packet. The traffic inspection module 218 may provide results of the inspection to the EEN module 216. The EEN module 216 may utilize the information from the switch fabric 214 and/or the traffic inspection module 218 to predict traffic in the switch 204 and schedule EEN events accordingly.

In an exemplary embodiment of the invention, the switch fabric 214 may indicate one or more ports and/or paths through the switch 204 associated with the packet and the traffic inspection module 218 may indicate the packet type. For example, the switch fabric 214 may indicate that the ingress port is port $220_1$ and that the egress port is port $220_4$. Furthermore, the traffic inspection module 218 may indicate that the packet is a request that will trigger a series of packets. Based on such information, the EEN module 216 may expect the series of packet to arrive via the port $220_1$ and be forwarded via the corresponding egress port $220_4$. Accordingly, the EEN module 214 may hold off from configuring a path between port $220_1$ and the port $220_4$ into an energy saving mode. Alternatively, if the path between port $220_1$ and the port $220_4$ is in an energy saving mode, the EEN module 216 may trigger a transition out of the energy saving mode in anticipation of the requested series of packets. It is noted that a path between the ports may not necessarily be static and components of the path may be utilized for other traffic.

In some embodiments of the invention, the network device 204 may utilize VLANs for conveying traffic between the ports $220_1$-$220_4$. For example, a packet received via port $220_1$ may be VLAN tagged and which of the ports $220_2$-$220_4$ that the packet is forwarded to may depend on the VLAN tag. Accordingly, aspects of the invention may enable the network device to determine one or more VLANs associated with a packet and configure portions of the device 204 associated with the VLAN. In this regard, if the packet is a broadcast or multicast packet, then it may be output via a plurality of the ports $220_1$-$220_4$ and corresponding portions of the network device 204 may be configured accordingly.

Although FIG. 2 illustrates exemplary details of a midpoint 104, aspects of the invention may apply equally to an endpoint 102.

Figure 3:
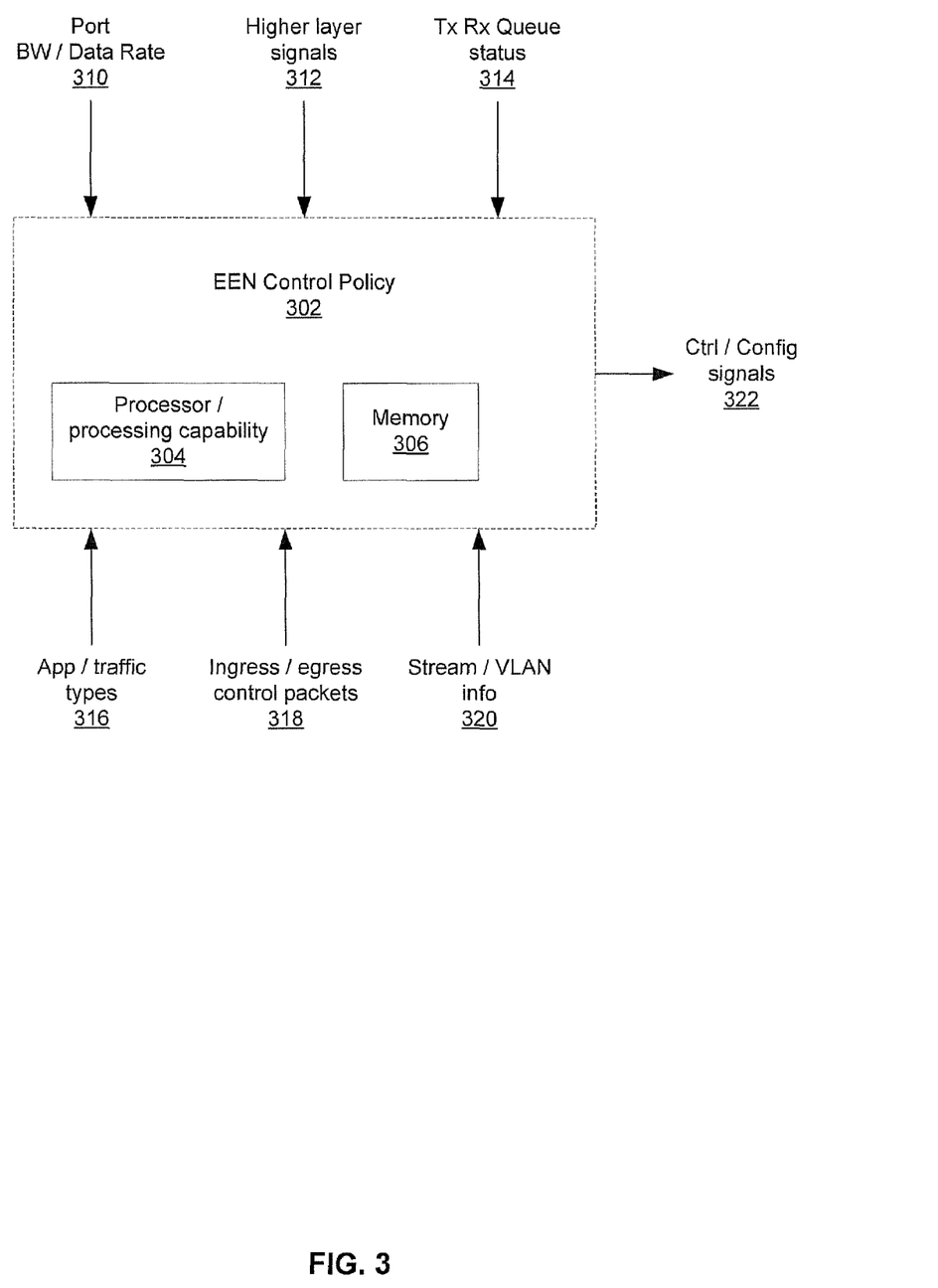
FIG. 3 is a diagram illustrating exemplary inputs to an EEN control policy, in accordance with an embodiment of the invention.

FIG. 3 is a diagram illustrating exemplary inputs to an EEN control policy, in accordance with an embodiment of the invention. Referring to FIG. 2 there is shown an EEN control policy 302 which may be implemented via one or more of a processor 304, a memory 306, and logic 308. In this regard, the processor 304 and/or the memory 306 may reside in a network device such as, for example, the switch 204 described with respect to FIG. 2. The control policy 302 may be utilized to generate control and/or configuration signals 322 based on inputs 310, 312, 314, 316, 318, 320, and 320. In this regard, the inputs depicted in FIG. 3 are for illustration purposes, and different EEN control policies may utilize none, some, or all of the depicted inputs and/or may utilize other parameters or information not shown in FIG. 3.

The processor 304 may comprise suitable logic, circuitry, interfaces, and/or code that may be operable to process data, generate signals, and/or execute code to implement the EEN control policy 312. In this regard, one or more of the inputs 310, 312, 314, 316, 318, 320, and 320 may be coupled to the processor 304. Additionally, the processor 304 may generate all or a portion of the configuration and/or control signals 322.

The memory 306 may comprise suitable logic, circuitry, interfaces, and/or code that may be operable to store data for implementation of the EEN control policy 312. In this regard, one or more of the inputs 310, 312, 314, 316, 318, 320, and 320 may be stored in the memory, instructions executed by the processor 304 may be stored in the memory 306, parameters configured by a network administrator may be stored in the memory 306, and at least a portion of the configuration and/or control signals 322 may be stored in the memory 306.

The input 310 may comprise bandwidth and/or data rate information for one or more ports of the network device. In this regard, the EEN control policy 302 may be utilized to make decisions based on a rate at which data is communicated by one or more network ports. For example, the data rate of a network port may vary based on results of auto-negotiation, based on a subrate in which one or more ports have been previously configured based on the EEN control policy 302, and/or based on an actual data rate measured on one or more network ports.

The input 312 may comprise signals and/or information from higher OSI layer functions. For example, the input 312 may comprise information about PCI express bus activity, CPU activity, system memory activity, or graphics subsystem activity.

The input 314 may comprise the status of one or more transmit and/or receive queues, network ports, and/or VLANs. For example, the input 314 may comprise information relating to how much data is stored in one or more queues and/or when data was last written to the queues and/or read from the queues.

The input 316 may comprise information about applications generating and/or receiving the communicated data. In this regard, the input 316 may indicate what applications are running on the local network device and/or on one or more remote network devices.

The input 318 may comprise information about detected control packets. In this regard, the input 318 may be generated by a traffic inspection module, such as the traffic inspection module 218 described with respect to FIG. 2. The input 318 may indicate when control packets were received, which port(s) they were received on, which port(s) they were destined for, and the type of control packet received. In an exemplary embodiment of the invention, the input 318 may indicate whether control packets to reserve an audio video bridging path have been received. In another exemplary embodiment of the invention, the input 318 may indicate whether control packets to setup a connection such as a VLAN or VoIP connection have been received.

In operation, a mode of operation of the switch 204 may be controlled based on the EEN control policy 302 residing in the switch 204. In this regard, the EEN control policy 302 may be utilized to determine which EEN techniques, such as LPI or subset PHY, to implement. In an exemplary embodiment of the invention, the EEN control policy 302 may be utilized to determine to go into LPI when a connection termination control packet is detected via the input 318. In this regard, upon input 318 indicating detection of a connection termination packet, the EEN control policy 302 may be utilized to determine that no traffic may be traversing a certain path until a new connection setup control packet is detected. Accordingly, the EEN control policy 302 may be utilized to configure associated portions of the network device into an energy saving mode until input 318 indicates detection of a connection setup packet.

In another exemplary embodiment of the invention, the EEN control policy 302 may be utilized to determine to exit an energy saving mode, or avoid entering an energy saving mode, upon input 318 indicating detection of a stream request packet. For example, a packet requesting a multimedia stream may be detected on an uplink path and a corresponding downlink path may then be wakened in preparation of receiving the multimedia stream. Furthermore, upon input 318 indicating detection of a control packet indicating the end of the stream, the downlink path may be configured back into an energy saving mode.

In various embodiments of the invention, the EEN control policy may be utilized to determine whether to enable transitions into or out of an energy saving mode. Furthermore, when EEN transitions are enabled, the EEM control policy may be utilized to determine when to transition into an energy saving mode, and when to transition out of an energy saving mode.

Figure 4A:
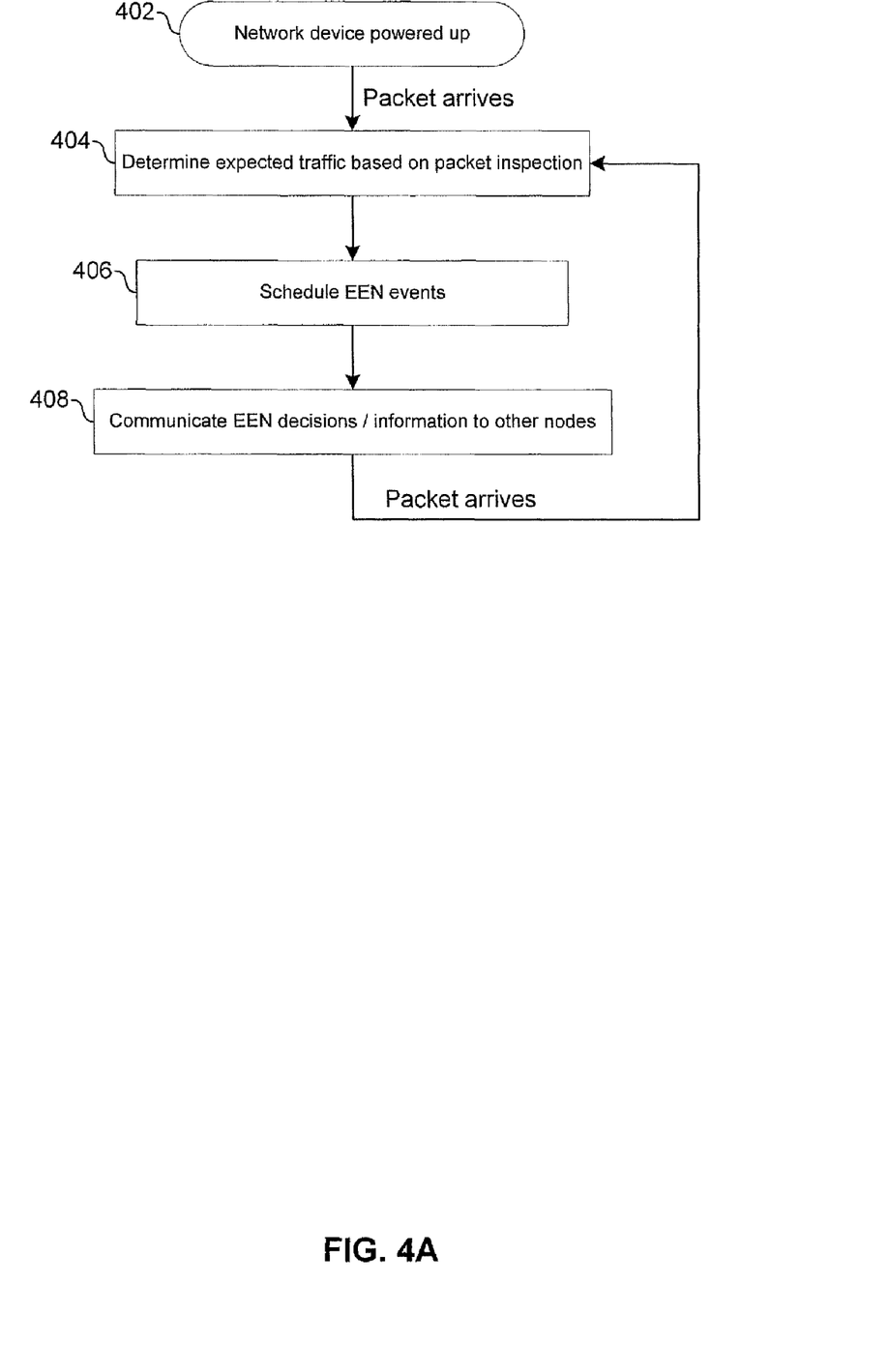
FIG. 4A is a flow chart illustrating exemplary steps for managing power consumption in a network device based on packet inspection, in accordance with an embodiment of the invention.

FIG. 4A is a flow chart illustrating exemplary steps for managing power consumption in a network device based on packet inspection, in accordance with an embodiment of the invention. Referring to FIG. 4A the exemplary steps may begin with step 402 when a network device, such as the network device 104 described with respect to FIG. 2, is powered up. Upon arrival of a packet at the network device 104, the exemplary steps may advance to step 404.

In step 404, the network device may begin inspecting its ingress traffic received via one or more ports, such as the ports $220_1$-$220_4$ described with respect to FIG. 2. In this regard, the network device 104 may examine the headers and/or other information associated with OSI layers 2 and/or higher OSI layers. Based on the packet inspection, the network device 104 may be operable to predict future traffic. Future traffic may be predicted based on packet type(s), protocols associated with inspected packets, applications associated with inspected packets, VLANs associated with inspected packets, and audio video bridging (AVB) streams associated with inspected packets. Subsequent to step 404, the exemplary steps may advance to step 406.

In step 406, EEN events, such as transitions into and/or out of an energy saving mode, may be scheduled based on the results of the packet inspection in step 404. For example, the packet inspection may result in a determination that a port may be idle for a particular period of time. Accordingly, portions of the network device 104 associated with that port may be placed into an energy saving mode. Conversely, packet inspection may result in a determination that a port may soon become active or may be active and will continue to be active for some period of time. Accordingly, portions of the network device 104 such as a switch fabric, amplifiers, buffers, echo cancellers, and crosstalk cancellers associated with that port may exit an energy saving mode and/or be prevented from entering an energy saving mode. For another example, packet inspection may enable the network device 104 to expect specific packets and the network device 104 may trigger EEN events upon the arrival of such packets. For example, various protocols may indicate the end of a packet stream with a distinct control packet. Thus, the network device 104 may be operable to look for such packets and enter an energy saving mode upon detecting such packets. Similarly, the network device 104 may be in an energy saving mode and may detect a packet sent to setup a connection, such as a VoIP connection. Accordingly, the network device 104 may exit the energy saving mode in anticipation of the data that will be communicated over the connection. Subsequent to step 406, the exemplary steps may advance to step 408.

In step 408, subsequent to making an EEN decision, such as a decision to enter or exit an energy saving mode, the network device 104 may communicate the decision to one or more link partners. In this regard, entering or exiting an energy saving mode may require coordination with link partners. Upon arrival of the next packet at the network device 104, the exemplary steps may return to step 404.

Figure 4B:
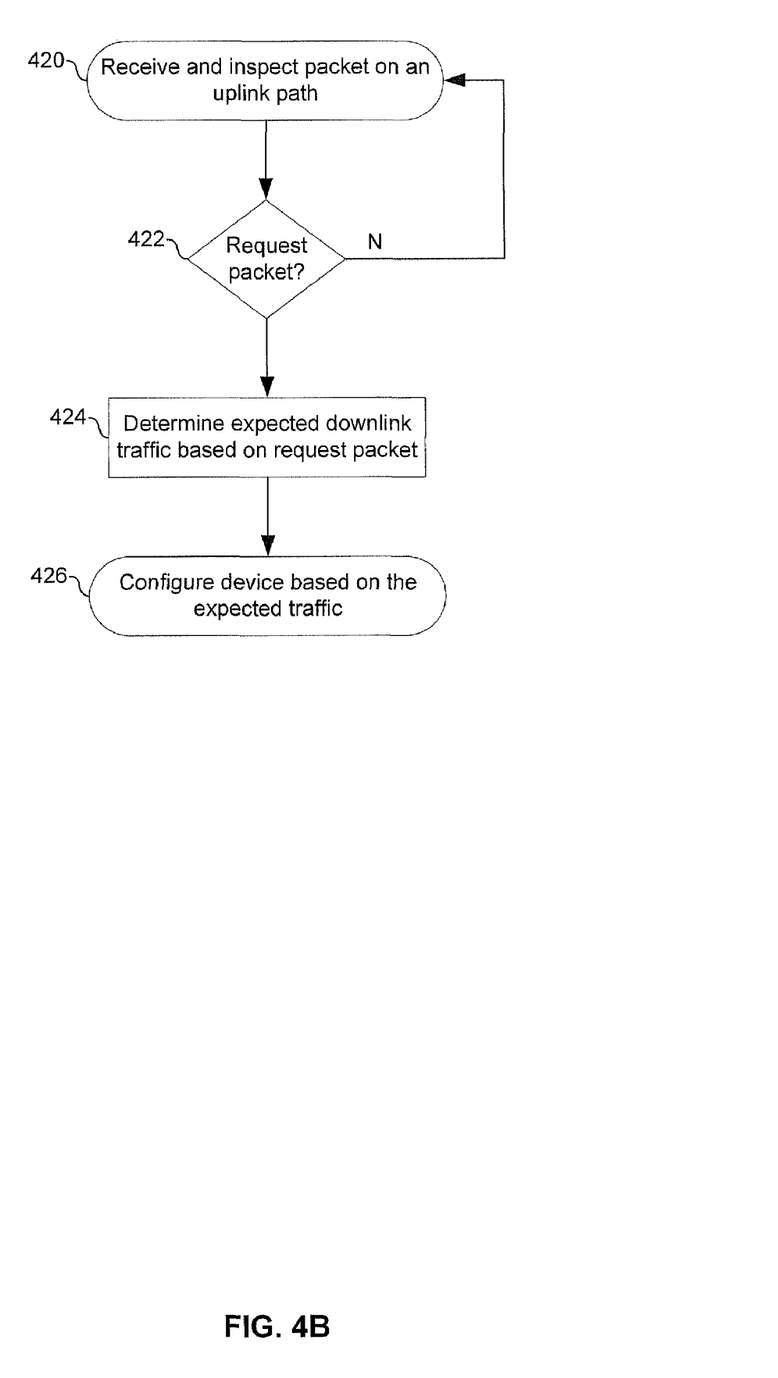
FIG. 4B is a flow chart illustrating configuring power consumption of a downlink path based on detection of control packets on an uplink path, in accordance with an embodiment of the invention.

FIG. 4B is a flow chart illustrating configuring power consumption of a downlink path based on detection of control packets on an uplink path, in accordance with an embodiment of the invention. Referring to FIG. 3B, the exemplary steps may begin with step 420 when a packet may be received in a network device 104 such as the switch 204 described with respect to FIG. 2, and the network device 104 may inspect the packet. Subsequent to step 420, the exemplary steps may advance to step 422.

In step 422, the network device 104 may determine whether the packet is a control packet associated with one or more protocols. In instances that the packet is not a control packet, the exemplary steps may return to step 420. In instances that the inspected uplink packet is a control packet, the exemplary steps may advance to step 424. In other embodiments of the invention, the network device may inspect, for example, headers of data packets. Also, in some embodiments of the invention, the uplink and downlink path may be determined by a VLAN tag associated with the packet.

In step 424, the network device 104 may predict traffic on a corresponding downlink path. In this regard, the control packet may be a request or connection setup packet that is indicative of forthcoming downlink traffic. Conversely, the control packet may close a connection or cancel a request and may thus be indicative of forthcoming inactivity on the corresponding downlink. Subsequent to step 424, the exemplary steps may advance to step 426.

In step 426, the network device 104 may be configured based on the predicted traffic. In instances that traffic is expected on the downlink, the downlink path may be configured into a mode to handle the expected data. For example, the downlink path may transition out of LPI or may be prevented from entering LPI for the expected duration of the traffic. Conversely, in instances that a period of inactivity is expected on the downlink path, the downlink path may enter LPI for the expected duration of the inactivity. Alternatively, for subset PHY, the downlink path may be configured into a mode of operation to handle the expected data rate of expected traffic.

In other embodiments of the invention, the network device may inspect traffic to detect data packets that comprise a header and/or marking that indicates a data stream instead of, or in addition to, looking for control packets associated with one or more protocols.

Steps similar to those in FIG. 4B may be utilized to configure a network device by inspecting downlink traffic to predict uplink traffic may proceed.

Various aspects of a method and system for energy efficient networking via packet inspection are provided. In an exemplary embodiment of the invention, a network device 104 may comprise one or more circuits 304 operable to inspect one or both of ingress and/or egress packets in the network device 104. The one or more circuits 304 may be operable to predict traffic in the network device 204 based on the inspection. The one or more circuits 304 may be operable to control, based on the predicted traffic, a mode of operation of the network device 204 to manage power consumption in the network device 104. The network device 104 may be configurable to operate in one or more energy saving modes. The one or more energy saving modes may comprise a low power idle mode and/or a subset PHY mode.

A downlink path 103 within the network device 104 may be configured based on inspection of packets conveyed along a corresponding uplink path 101. An uplink path 101 within the network device 104 may be configured based on inspection of packets conveyed along a corresponding downlink path 103. The packets may be inspected to detect control packets associated with one or more protocols. Upon detecting a control packet, the one or more processors 304 may be operable to schedule transitions between modes of operation. The one or more circuits 304 may be operable to inspect a packet to determine one or more applications running on one of more link partners 102 and/or 106 communicatively coupled to the network device 104. The one or more circuits 304 may also be operable to inspect a packet to determine one or more protocols in use by one or more link partners 102 and/or 106 communicatively coupled to the network device 104.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for energy efficient networking via packet inspection.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   performing using one or more circuits in a network device, functions comprising:
      inspecting one or both of ingress and/or egress packets in said network device, wherein said inspection identifies which of said ingress and/or said egress packets comprise control packets associated with one or more protocols;
      predicting traffic in said network device based on said inspection; and
      based on said predicted traffic, controlling a mode of operation of said network device to manage power consumption in said network device.

2. The method according to claim 1, wherein said network device is configurable to operate in one or more energy saving modes.

3. The method according to claim 2, wherein said one or more energy saving modes comprise a low power idle mode or a subset PHY mode.

4. The method according to claim 1, wherein said network device is one of a switch, a router, a bridge, a personal computer, and a server.

5. A method for networking, the method comprising:
   performing using one or more circuits in a network device, functions comprising:
      inspecting one or both of ingress and/or egress packets in said network device;
      predicting traffic in said network device based on said inspection;
      based on said predicted traffic, controlling a mode of operation of said network device to manage power consumption in said network device; and
      configuring one or both of: a downlink path and/or an uplink path within said network device based on said inspection of packets conveyed along a corresponding uplink path and/or a corresponding downlink path.

6. The method according to claim 1, comprising scheduling transitions between modes of operation upon detecting one of said control packets.

7. A method for networking, the method comprising:
   performing using one or more circuits in a network device, functions comprising:
      inspecting one or both of ingress and/or egress packets in said network device;
      inspecting said packets to determine one or both of: one or more applications running on one or more link partners communicatively coupled to said network device and/or one or more protocols in use by said one or more link partners communicatively coupled to said network device;
      predicting traffic in said network device based on said inspection; and
      based on said predicted traffic, controlling a mode of operation of said network device to manage power consumption in said network device.

8. A system for networking, the system comprising:
   one or more circuits for use in a network device, wherein said one or more circuits are operable to:
      inspect one or both of ingress and/or egress packets of said network device, wherein said inspection identifies which of said ingress and/or said egress packets comprise control packets associated with one or more protocols;
      predict traffic in said network device based on said inspection; and/or
      control a mode of operation of said network device to manage power consumption in said network device, based on said predicted traffic.

9. The system according to claim 8, wherein said network device is configurable to operate in one or more energy saving modes.

10. The system according to claim 9, wherein said one or more energy saving modes comprise a low power idle mode or a subset PHY mode.

11. The system according to claim 9, wherein said network device is one of a switch, a router, a bridge, a personal computer, and a server.

12. A system for networking, the system comprising:
    one or more circuits for use in a network device, wherein said one or more circuits are operable to:
       inspect one or both of ingress and/or egress packets of said network device;
       predict traffic in said network device based on said inspection;
       control a mode of operation of said network device to manage power consumption in said network device, based on said predicted traffic; and
       configure one or both of: a downlink path and/or an uplink path within said network device based on said inspection of packets conveyed along a corresponding uplink path and/or a corresponding downlink path.

13. The system according to claim 8, wherein said one or more circuits are operable to schedule transitions between modes of operation upon detecting one of said control packets.

14. A system for networking, the system comprising:
    one or more circuits for use in a network device, wherein said one or more circuits are operable to:
       inspect one or both of ingress and/or egress packets of said network device;
       inspect a packet to determine one or both of: one or more applications running on one or more link partners communicatively coupled to said network device and/or one or more protocols in use by said one or more link partners communicatively coupled to said network device;

predict traffic in said network device based on said inspection; and control a mode of operation of said network device to manage power consumption in said network device, based on said predicted traffic.

* * * * *